United States Patent Office 3,197,301
Patented July 27, 1965

3,197,301
LIQUID FERTILIZERS INHIBITED AGAINST CORROSION
Charles William Lutz, Clark, N.J., assignor to FMC Corporation, New York, N.Y., a corporation of Delaware
No Drawing. Filed Jan. 4, 1963, Ser. No. 249,317
12 Claims. (Cl. 71—28)

This invention relates to improved phosphorus-containing liquid fertilizers, and particularly to phosphoric acid- and ammonium phosphate-containing liquid fertilizer compositions inhibited against corrosion of mild steel.

Phosphoric acid is used widely as a source of phosphorus in fertilizers, as a primary plant nutrient. It may be applied to the soil as the concentrated acid directly, or neutralized with ammonia to form liquid fertilizer solutions of various compositions. Typical neutralized compositions include the 8–24–0 mixture (8 weight percent nitrogen, 24 weight percent phosphorus as $P_2O_5$, and 0 weight percent potassium as $K_2O$), and the 6–18–6 mixture (6 weight percent nitrogen, 18 weight percent $P_2O_5$, and 6 weight percent $K_2O$).

Use of these liquid fertilizers has had a serious drawback, however, which has limited their use; the liquids are corrosive to inexpensive mild steel equipment. The most offensive liquid fertilizer from the viewpoint of corrosion has been concentrated aqueous phosphoric acid. Particularly when this highly corrosive acid has been used, it has been necessary to formulate, store and use the fertilizer in expensive equipment formed of corrosion-resistant materials such as stainless steel or rubber or plastic lined mild steel.

Various inhibitors have been developed for use with these liquid fertilizers in an attempt to overcome the problem of corrosion. For example, the mono- and di- long-chain-alkyl quaternary ammonium compounds are described as corrosion inhibitors in copending Serial No. 33,651 now abandoned, having a common assignee with the present application. Further, various chlorine compounds together with molybdates have been developed as inhibitors for ammonium phosphate liquid fertilizers, in particular as inhibitors against attack by the fertilizer on aluminum systems.

However, to date no inhibitor has been found which will both inhibit concentrated aqueous phosphoric acid and liquid, aqueous ammonium phosphate fertilizers against attack on mild steel and therefore make it possible to use these liquid fertilizers with such inexpensive equipment, and at the same time remain in solution in these fertilizers where it will be available at all times to effect the necessary inhibition. Inhibitors which are not compatible separate as gummy materials which clog equipment and coat tank walls and the like in use of the fertilizer.

Accordingly, it is a feature of this invention to provide an inhibitor which will reduce the attack of phosphorus-containing liquid fertilizers on mild steel.

It is a further feature to provide such an inhibitor which has a high degree of compatibility in these liquid fertilizers, such that an effective concentration of the inhibitor remains in solution to inhibit corrosion of mild steel by the fertilizer and does not separate out and interfere with the use of the fertilizer.

It has now been discovered that di-long-chain-alkyl dimethyl ammonium chlorides in which the alkyl chains have 8 to 18 carbon atoms and rosin amine derivatives having the formula:

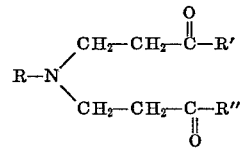

where R is an abietyl, hydroabietyl or dehydroabietyl radical, and R′ and R″ are lower alkyl or phenyl radicals, together form base compositions which alone or with added agents such as additional inhibitors or solubilizing agents have a greater inhibiting effect on phosphorus-containing aqueous solutions such as liquid fertilizers than do either of the two ingredients alone, even when either of the individual ingredients is used alone in greater amount than the additive amount of the two in admixture.

This synergistic base mixture of these two ingredients is compatible with the fertilizers and is effective to inhibit them against corrosion of mild steel when they are present together in as little an amount as 0.04 total percent by weight based on the aqueous phosphorus-containing solution. Amounts up to about 0.2 weight percent of the combination on this basis can be used to provide effective inhibition coupled with compatibility with the fertilizer. The two ingredients normally are employed in the relative proportions by weight of about 3 to 1 parts of the particular alkyl dimethyl ammonium chloride to 1 to 3 parts by weight of the rosin amine derivative, with the preferred compositions containing about equal parts by weight to about 2 parts of the former for each part of the latter. The rosin amine derivative normally but not necessarily is used in the form of its hydrochloride, since this is the form in which it is readily prepared.

The present synergistic inhibitor mixtures have a high degree of compatibility with the liquid fertilizers, such that whereas either ingredient alone will often form cloudy mixtures with fertilizers and separate from them, the mixtures form clear solutions which are stable against separation of the inhibitor from the fertilizer under conditions which are normally encountered.

The liquid fertilizers which are inhibited against corrosion with the present mixtures are phosphorus-containing aqueous solutions. Phosphoric acid having a concentration of on the order of 75%, namely, about 60 to 85 weight percent, is used widely as a phosphorus source; alternatively it frequently is applied to the soil after having been neutralized with ammonia to form liquid fertilizer solutions such as the 8–24–0 or 6–18–6 types referred to above. The neutralized aqueous phosphate solutions normally are concentrated, containing about 20 to 40 weight percent of the fertilizer. Preferably they will be near the saturation concentration for the given fertilizer.

The neutralized fertilizer compositions may contain various mixtures of monoammonium phosphate, diammonium phosphate, ammonium nitrate, ammonium sulfate, urea, potassium chloride, potassium nitrate, potassium phosphate, dipotassium phosphate and the like, admixed in any desired fashion. They may be formed by reaction of anhydrous ammonia, aqua ammonia, phosphoric acid, potassium hydroxide and the like to produce a salt solution. The mixtures are blended in any desired fashion to provide the fertilizer having the desired concentration of nitrogen and phosphorus, and if desired, potassium.

The most corrosive of the liquid fertilizer solutions toward mild steel equipment is concentrated phosphoric acid. Accordingly, the corrosion tests shown by way of example hereinafter were carried out with phosphoric acid solutions.

The present inhibitor compositions contain as an essential ingredient certain rosin amine derivatives from a class described in U.S. Patent 2,758,970; this class may be represented by the formula:

where R is a radical selected from the group consisting of abietyl, hydroabietyl and dehydroabietyl, Y is the group $CH_2 \cdot R_1$, X is a radical selected from the group consisting of hydrogen and $CH_2 \cdot R_1$, and $R_1$ represents alpha ketonyl groups.

Rosin amine derivatives from this class which have been found to be useful in forming the herein synergistic mixtures may be represented by the formula:

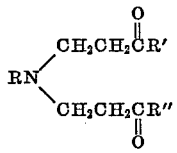

where R is a radical selected from the group consisting of abietyl, hydroabietyl and dehydroabietyl and R' and R" may be the phenyl radical or a lower alkyl radical having 1 to 4 carbon atoms. As disclosed in U.S. Patent 2,758,976, they are prepared by reacting the rosin amine, formaldehyde and the ketone which will give the desired compound, for example, acetone or acetophenone. The rosin amine is a primary amine derived from rosin and rosin acids, whether or not hydrogenated or dehydrogenated. The reaction to form the derivative takes place in acid medium, for example, in hydrochloric acid such that the product is a hydrochloride. Other acids than hydrochloric may be employed, for example hydrobromic, acetic or sulfuric acid.

The rosin amine additive has value of itself as an inhibitor against corrosion of metals by various acids. However, as will be shown hereinafter it suffers the disadvantages that it does not adequately inhibit corrosion of mild steel by phosphoric acid and ammonium phosphate solutions, and further that it has limited compatibility with such solutions.

The other essential ingredient of the herein inhibitor mixture is a di-long-chain-alkyl quaternary ammonium compound.

These compounds have the following formula:

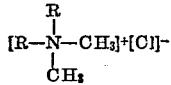

wherein the R radicals are alkyl radicals having 8 to 18 carbon atoms. These materials are available commercially, normally carried in inactive ingredients such as water or mixtures of water with alcohols such as isopropanol. These compounds also have an inhibiting effect on concentrated phosphoric acid solutions; however, alone they either are not sufficiently active in inhibition to satisfy demands for use of the liquid systems with mild steel equipment, or they are insufficiently compatible to provide inhibition under normal use and operating conditions.

Mixtures of these two ingredients, the rosin amine derivative and the quaternary ammonium compound, preferably are prepared from about equal proportions of the two by weight to about two parts of the rosin amine derivative for each part of the other ingredient, although they may be used in proportions by weight of the two of about 3:1 to 1:3.

The relative proportions of the two ingredients employed in the composition is determined on the basis of the particular system being inhibited and the particular rosin amine derivative and quaternary ammonium compound employed. The mixture is employed in the amount of at least about 0.04 weight percent in the aqueous system being inhibited; normally no more than about 0.2 weight percent of the mixture is used in the system, since use of more than this amount may cause incompatibility of the inhibitor with the phosphorus-containing solution and in any event is undesirable economically.

As much as about equal amounts of additional ingredients may be employed together with the up to about 0.2 weight percent of the base inhibitor mixture of the rosin amine derivative and the quaternary ammonium compound in order to improve the corrosion inhibiting character of the mixture, particularly over extended periods, without loss of compatibility. Cationic wetting agents, for example, polyethoxylated quaternary ammonium salts such as

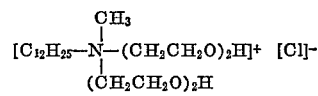

anti-pitting agents such as tolyl mercapto acetic acid, and additional agents such as propargyl alcohol, isopropyl alcohol, and the like may be employed.

The inhibitors preferably are predissolved, normally with the aid of a solvent such as an isopropanol- or other alcohol-water mixture, or an alcohol alone, and added in this form to the acid or ammonium phosphate system with stirring to form clear solutions which show no evidence of separation of the inhibitor. This is in marked contrast to the insolubility evidenced when either the rosin amine derivative or most quaternary ammonium compounds are mixed in inhibiting quantities with aqueous phosphoric acid or ammonium phosphate solutions.

EXAMPLE 1

Mild steel specimens, 3 x 1½ x ⅛ inch strips conforming to AISI 1018 cold rolled specifications, were cleaned by surface degreasing, acid pickling in 10% HCl and neutralization in $NaHCO_3$, after which they were rinsed and dried. They were then weighed to ±0.1 mg.

The mild steel strips prepared in this manner were then placed in beakers containing 490 g. of 75% phosphoric acid held at 50° C. At the end of 2 days the strips were removed, water rinsed, dried and weighed. The rate of corrosion during the 2-day period was determined in mils per year (m.p.y.). Calculations were carried out using the following formula:

If $W$=loss in weight (in grams) of the test piece during the time of immersion, $A$=area of test piece in square inches, $S$=density of the metal in grams per cubic centimeter, $T$=time of exposure in hours, and m.p.y.=the rate of chemical corrosion expressed as mils penetration per year, then $$M.p.y. = \frac{1000 \times 24 \times 30 \times 12 \times W}{(2.54)^3 AST}$$

Since $A$=9.0 sq. in. and $S$=7.80, $$M.p.y. = \frac{1000 \times 24 \times 30 \times 12 \times W}{(2.54)^3 \times 9 \times 7.8 \times 48} = 158W$$

for this test.

A rate of corrosion of 50 m.p.y. would thus mean a metal loss of 0.316 g. during the period of immersion. An m.p.y. of under 15 is considered acceptable, but the lower values are even more desirable.

The following table shows the results of a series of tests carried out as described above, with various rosin amine derivative-quaternary ammonium compound admixtures falling within the scope of the present invention:

Table I

| Example | Inhibitor System | Component Conc.[1] | Total Conc.[1] | Static Corrosion Rate (m.p.y.)[2] | 75% H₃PO₄ Compatibility | 8-24-0 Compatibility |
|---|---|---|---|---|---|---|
| 1 | Dialkyl dimethyl ammonium chloride [3] | 0.08 | 0.08 | 32 | Solids separate | Cloudy. |
| 2 | Rosin amine derivative [4] | 0.08 | 0.08 | 71 | do | Do. |
| 3 | Dialkyl dimethyl ammonium chloride [3] <br> Rosin amine derivative [4] | 0.04 <br> 0.04 | 0.08 | 11 | No solids separate | Clear. |
| 4 | Dialkyl dimethyl ammonium chloride [3] <br> Rosin amine deriv.[5] | 0.04 <br> 0.04 | 0.08 | 14 | do | Do. |
| 5 | Dialkyl dimethyl ammonium chloride [3] <br> Rosin amine deriv.[6] | 0.04 <br> 0.04 | 0.08 | 13 | do | Do. |
| 6 | Rosin amine deriv.[4] <br> Polyethoxylated quaternary ammonium salt [7] | 0.08 <br> 0.045 | 0.125 | 20 | Solids separate | Cloudy. |
| 7 | Dialkyl dimethyl ammonium chloride [3] <br> Rosin amine deriv.[4] <br> Polyethoxylated quaternary ammonium salt [7] | 0.04 <br> 0.04 <br> 0.045 | 0.125 | 3 | No solids separate | Clear. |
| 8 | Rosin amine deriv.[4] <br> Tergitol NP-35 [8] | 0.08 <br> 0.03 | 0.11 | 24 | Solids separate | Cloudy. |
| 9 | Dialkyl dimethyl ammonium chloride [3] <br> Rosin amine deriv.[4] <br> Tergitol NP-35 [8] | 0.04 <br> 0.04 <br> 0.03 | 0.11 | 15 | No solids separate | Clear. |

[1] Concentrations are expressed in terms of amount of ingredient in the fertilizer as weight percent of the active ingredient excluding solvents and other carriers.

[2] Two days at 50° C.

[3]
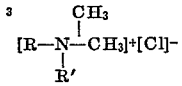

where R and R' are alkyl groups having 8 to 18 carbon atoms in the amount of 8% octyl, 9% decyl, 47% dodecyl, 18% tetradecyl, 8% hexadecyl and 10% octadecyl, introduced as 75% active ingredient in isopropyl alcohol.

[4] 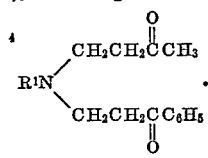  [5] 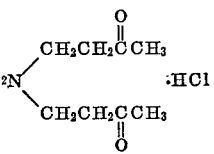

[6] 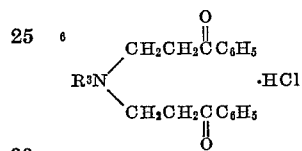

where in 4, 5 and 6, $R^3$ is abietyl, $R^2$ is hydroabietyl and $R^1$ is dehydroabietyl; introduced as about 85% active ingredient in about 10% isopropanol, balance water.

[7]
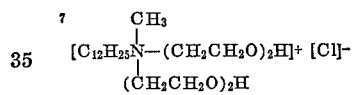

[8] Nonyl phenyl polyethylene glycol ether; a water-soluble, 100% active ingredient nonionic detergent having a cloud point of 96° C. Sold by Union Carbide Corporation as Tergitol NP-35.

EXAMPLE 10

A particularly useful inhibitor composition was compounded of the following amounts of ingredients in the indicated amounts:

| Component: | Active component concentration in percent by wt. in the fertilizer |
|---|---|
| Dialkyl dimethyl ammonium chloride used in Example 1 | 0.04 |
| Rosin amine derivative used in Example 2 | 0.04 |
| Polyethoxylated quaternary ammonium salt used in Example 3 | 0.04 |
| Tolyl mercapto acetic acid | 0.01 |
| Propargyl alcohol | 0.01 |
| | 0.14 |

This composition at the indicated concentration of 0.14% in 75% phosphoric acid gave a corrosion value of less than 1 m.p.y. in 2 days, and after 21 days a corrosion value of only 1 m.p.y. when tested for corrosion as described in Examples 1–9. The composition likewise was compatible with 75% phosphoric acid and an 8-24-0 ammonium phosphate mixture, giving stable clear solutions over extended periods.

Such compositions containing about 0.02 to 0.06% of the dialkyl dimethyl ammonium chloride, 0.01 to 0.06% of the rosin amine derivative, 0.02 to 0.06% of the polyethoxylated quaternary ammonium salt, 0.005 to 0.02% of the tolyl mercapto acetic acid and 0.001 to 0.02% of the propargyl alcohol also are highly compatible against solids separation and low in corrosive effect on mild steel.

When the dialkyl dimethyl ammonium chloride was replaced in the composition of Example 10 with an additional 0.04% of the rosin amine derivative employed in that example, the compatibility of the composition with 75% phosphoric acid and 8-24-0 fertilizers was poor, the system showing substantial separation of gummy materials. Corrosion inhibition also was reduced.

It will be seen from the above examples that even in the most corrosive aqueous phosphorus-containing liquid fertilizer solutions, namely the 75% phosphoric acid aqueous liquid fertilizers, the present inhibitor mixtures provide both a high degree of compatibility and a strong inhibiting action against corrosion of mild steel by the liquid. This quality of the inhibitor mixtures is materially improved over inhibitor mixtures in which either the dialkyl dimethyl ammonium chloride or the rosin amine derivative is not present. The preferred composition of Example 10 is seen to be remarkably effective even when compared with the other compositions of this invention.

The importance of the combination of compatibility of the inhibitor with the phosphorus-containing liquid fertilizer solution and inhibition of corrosion of mild steel by the fertilizer solution is evident. The fertilizer must be transported and stored for long periods of time, and systems which tend to separate may not contain sufficient inhibitor in solution to guard against attack on transport or storage equipment at all times. The present inhibitors make it possible to employ inexpensive mild steel equipment for mixing, storage and transport of the fertilizers, without fear of excessive corrosion of this equipment.

Pursuant to the requirements of the patent statutes, the principle of this invention has been explained and exemplified in a manner so that it can be readily practiced by those skilled in the art, such exemplification including what is considered to represent the best embodiment of the invention. However, it should be clearly understood that, within the scope of the appended claims, the invention may be practiced by those skilled in the art, and having the benefit of this disclosure otherwise than as specifically described and exemplified herein.

What is claimed is:

1. Aqueous phosphorus-containing solution having a high degree of compatibility against component separation and inhibited against corrosion of mild steel, said aqueous solution having a phosphorus-containing ingredient from the group consisting of concentrated phosphoric acid and an ammonium phosphate and essentially containing as a base inhibitor against said corrosion, 0.04 to 0.2 weight percent of a mixture of (a) a di-long-chain-alkyl dimethyl ammonium chloride in which said alkyl groups have 8 to 18 carbon atoms, and (b) a rosin amine derivative having the following formula:

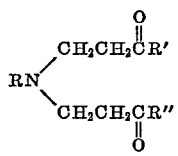

where R is a member from the group consisting of abietyl, hydroabietyl and dehydroabietyl, and R' and R" are members from the group consisting of lower alkyl radicals having 1 to 4 carbon atoms and phenyl radicals, in the relative proportions by weight of 3:1 to 1:3 of (a) to (b).

2. Solution of claim 1 in which the (a) di-long-chain-alkyl dimethyl ammonium chloride and (b) rosin amine derivative, are present in the relative proportions by weight of 1:1 to 1:2 of (a) to (b).

3. Solution of claim 1 in which the rosin amine derivative has the folowing formula:
where R is a member from the group consisting of abietyl, hydroabietyl and dehydroabietyl;

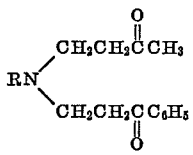

4. Solution of claim 1 in which the rosin amine derivative has the following formula:

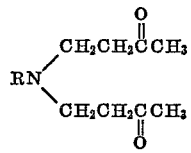

where R is a member from the group consisting of abietyl, hydroabietyl and dehydroabietyl.

5. Solution of claim 1 in which the rosin amine derivative has the following formula:

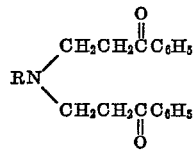

where R is a member from the group consisting of abietyl, hydroabietyl and dehydroabietyl.

6. Aqueous phosphorus-containing solution having a high degree of compatibility against component separation and inhibited against corrosion of mild steel, said aqueous solution having a phosphorus-containing ingredient from the group consisting of concentrated phosphoric acid and an ammonium phosphate, and essentially containing as an inhibitor against corrosion, 0.02 to 0.06% of a di-long-chain-alkyl dimethyl ammonium chloride in which said alkyl groups have 8 to 18 carbon atoms, 0.01 to 0.06% of a rosin amine derivative having the following formula:

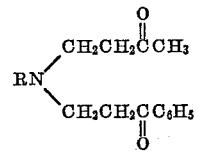

where R is a member from the group consisting of abietyl, hydroabietyl and dehydroabietyl, 0.02 to 0.06% of a polyethoxylated quaternary ammonium salt having the formula:

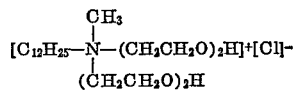

0.005 to 0.02% of tolyl mercapto acetic acid and 0.001 to 0.02% of propargyl alcohol.

7. Composition for inhibiting aqueous phosphorus-containing solutions from the group consisting of concentrated aqueous phosphoric acid solutions and aqueous ammonium phosphate solutions against corrosion of mild steel, said composition essentially containing (a) a di-long-chain-alkyl dimethyl ammonium chloride in which said alkyl groups have 8 to 18 carbon atoms, and (b) a rosin amine derivative having the following formula:

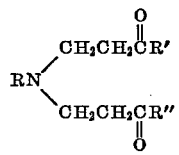

where R is a member from the group consisting of abietyl, hydroabietyl and dehydroabietyl, and R' and R" are members from the group consisting of lower alkyl radicals having 1 to 4 carbon atoms and phenyl radicals, in the relative proportions by weight of 3:1 to 1:3 of (a) to (b).

8. Composition of claim 7 in which the (a) di-long-chain-alkyl dimethyl ammonium chloride and (b) rosin amine derivative, are present in the relative proportions by weight of 1:1 to 1:2 of (a) to (b).

9. Composition of claim 7 in which the rosin amine derivative has the following formula:

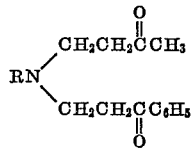

where R is a member from the group consisting of abietyl, hydroabietyl and dehydroabietyl.

10. Composition of claim 7 in which the rosin amine derivative has the following formula:

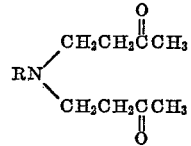

where R is a member from the group consisting of abietyl, hydroabietyl and dehydroabietyl.

11. Composition of claim 7 in which the rosin amine derivative has the following formula:

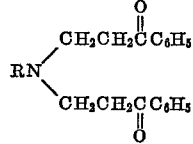

where R is a member from the group consisting of abietyl, hydroabietyl and dehydroabietyl.

12. Composition of claim 7 having as essential ingredients, in the recited proportional amounts by weight, 2 to 6 parts of a di-long-chain-alkyl dimethyl-ammonium chloride in which said alkyl groups have 8 to 18 carbon atoms, 1 to 6 parts of a rosin amine derivative having the following formula:

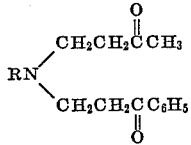

where R is a member from the group consisting of abietyl, hydroabietyl and dehydroabietyl, 2 to 6 parts of a polyethoxylated quaternary ammonium salt having the formula:

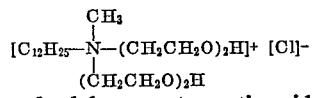

0.5 to 2 parts of tolyl mercapto acetic acid and 0.1 to 2 parts of propargyl alcohol.

References Cited by the Examiner
UNITED STATES PATENTS

| | | | |
|---|---|---|---|
| 2,006,216 | 6/35 | MacArthur et al. | 252—148 |
| 2,336,448 | 12/43 | Cox | 23—165 |
| 2,567,156 | 9/51 | Malowan | 23—165 |
| 2,659,693 | 11/53 | Lytle | 252—390 |
| 2,758,970 | 8/56 | Saukaitis et al. | 252—8.55 |

DONALL H. SYLVESTER, *Primary Examiner.*
ANTHONY SCIAMANNA, *Examiner.*

---

UNITED STATES PATENT OFFICE
CERTIFICATE OF CORRECTION

Patent No. 3,197,301                               July 27, 1965

Charles William Lutz

It is hereby certified that error appears in the above numbered patent requiring correction and that the said Letters Patent should read as corrected below.

Column 3, line 35, for "2,758,976" read -- 2,758,970 --; column 7, in claim 3, the formula appearing at lines 37 to 43 should appear at line 34 after "formula:".

Signed and sealed this 22nd day of February 1966.

(SEAL)
Attest:

ERNEST W. SWIDER
Attesting Officer

EDWARD J. BRENNER
Commissioner of Patents

UNITED STATES PATENT OFFICE
CERTIFICATE OF CORRECTION

Patent No. 3,197,301

July 27, 1965

Charles William Lutz

It is hereby certified that error appears in the above numbered patent requiring correction and that the said Letters Patent should read as corrected below.

Column 3, line 35, for "2,758,976" read -- 2,758,970 --; column 7, in claim 3, the formula appearing at lines 37 to 43 should appear at line 34 after "formula:".

Signed and sealed this 22nd day of February 1966.

(SEAL)
Attest:

ERNEST W. SWIDER
Attesting Officer

EDWARD J. BRENNER
Commissioner of Patents